United States Patent [19]

Budelman et al.

[11] Patent Number: 4,934,717

[45] Date of Patent: Jun. 19, 1990

[54] QUICK EXCHANGE TOOL HOLDER DEVICE

[76] Inventors: Abe Budelman, R.D. 3 Thompson Grove Rd., Freehold, N.J. 07728; Andrew Cirlincione, 60 Maxim Southard Rd., Howell, N.J. 07731

[21] Appl. No.: 363,872

[22] Filed: Jun. 9, 1989

[51] Int. Cl.⁵ .............................................. B23B 31/04
[52] U.S. Cl. ........................................ 279/79; 81/438; 81/177.85
[58] Field of Search .................... 279/1 SG, 23 R, 35, 279/46 R, 79, 89, 93.4; 81/177.85, 177.1, 436–439; 403/321, 322, 325–327, 329

[56] References Cited

U.S. PATENT DOCUMENTS

| | | | |
|---|---|---|---|
| 395,450 | 1/1889 | Morgan | 81/439 |
| 1,469,792 | 10/1923 | Johnson | 81/438 |
| 1,743,505 | 1/1930 | Turgeon | 279/79 |
| 1,784,911 | 12/1930 | Schlitters, Jr. et al. | 279/76 |
| 2,336,325 | 12/1943 | Weber | 279/79 |
| 2,410,971 | 11/1946 | Hartley | 81/475 |
| 2,682,414 | 6/1954 | Richardson | 279/77 |
| 2,736,562 | 2/1956 | Blackburn | 279/76 |
| 3,367,727 | 2/1968 | Ward et al. | 279/76 |

Primary Examiner—Meislin D. S.
Attorney, Agent, or Firm—Larson and Taylor

[57] ABSTRACT

A tool holder device for drill bits, screw tip bits and like tools permits rapid exchange of the tools. A holder body of the device defines a tool receiving opening in one end thereof for receiving the shank of a tool therein. A spring clip is secured at one end thereof to the holder body and is movable between an operative position wherein the other end of the clip engages and retains a tool received in the opening in the holder body and an inoperative position wherein the clip is out of engagement with that tool so that the tool can be replaced. An axially movable control pin is received in a transverse bore through the holder body and is of a length longer than that bore. A control lever secured to the holder body is movable between a first position wherein the control lever engages one end of the pin and causes movement of the pin to a position wherein the other end of the pin causes positioning of the clip in the inoperative position thereof, and a second position wherein the control lever is out of engagement with the pin and thereby permits movement of the retaining clip to the operative positive thereof.

14 Claims, 1 Drawing Sheet

QUICK EXCHANGE TOOL HOLDER DEVICE

FIELD OF THE INVENTION

The present invention relates to a holder device for tools such as drill bits, screwdriver (screw) bits and the like and, more particularly, to an improved quick disconnection tool holder device which provides positive retention of such a tool therein while enabling the tool to be quickly and readily released.

BACKGROUND OF THE INVENTION

Tools and tool holders of various kinds have been developed which releasably retain a bit or other tool in place so as to enable different bits or tools to be used with the same device by simply substituting one tool for another. For example, power tools such as drills are provided with chucks which enable different drill bits (e.g., bits of different lengths and/or diameters) to be used. There are problems with many tools of this type with respect to the nature of retention or holding forces provided thereby. Some simple tools of this type do not provide any positive retaining forces other than those provided by the friction fit between the shank of the tool and the walls of the tool holding portion, whereas others, although providing positive retention, e.g., through the drawing together of the jaws of a chuck, require considerable manipulation to effect retention of a tool in place therein.

Some examples of tools and tool holders which provide positive retention forces through the use of retaining clips, spring-loaded dogs, detents and the like to hold a tool in place include those disclosed in the following patents: U.S. Pat. Nos. 1,469,792 (Johnson); 1,784,911 (Schlitters, Jr., et al); 2,410,971 (Hartley); 2,682,414 (Richardson); 2,736,562 (Blackburn); and 3,367,727 (Ward et al). Briefly considering these patents, the Hartley patent discloses a screw driver including a tool or bit having an annular groove therein adapted to be engaged by a retaining spring finger. The Richardson patent discloses a longitudinally adjustable screw driver including a tool having shank including receiver therein adapted to be engaged by the dog of a spring-loaded, pivoted retaining assembly. The Blackburn patent discloses a drill assembly wherein a ball is used to retain a tool in place. The Schlitters, Jr. et al patent discloses a tool retaining device including a detent which engages in a groove in the shank of a tool. The Ward et al patent discloses an oral surgery tool wherein interchangeable blades are held in place by a ball detent arrangement. The Johnson patent discloses a screw driver including a removable blade held in place by a U-shaped spring.

SUMMARY OF THE INVENTION

In accordance with the invention, a quick disconnect tool holding device is provided which is rugged in construction, which is easy to manufacture and use, and which overcomes the disadvantages of the prior art with respect to the nature of the retention provided thereby. In this latter regard, the device of the invention provides superior, positive retention of a bit or other tool held thereby, while permitting rapid release of the tool so as to enable ready and quick replacement by another tool. Thus, the tool holder device of the invention enables ready, rapid changing between, e.g., bits of different sizes and/or screw tips of different types, and in this regard, such an exchange of tools typically requires only two or three seconds to complete, and can be accomplished in a one-handed operation.

According to a preferred embodiment of the invention, there is provided a quick disconnect or quick exchange tool holder device for drill bits, screw bits and like tools of the type including a shank, the device comprising: a holder body defining a tool receiving opening in one end thereof for receiving the shank of a tool therein; a retaining clip secured at one end thereof to the holder body and movable between a operative position wherein the other end of said clip engages a tool received in the opening in said holder body, and thus holds the tool in place, and an inoperative position wherein the clip is out if engagement with that tool; an axially movable control pin received in a transverse bore through the holder body and of a length longer than the bore; and a control lever mounted on the holder body for movement between a first position wherein the control lever engages one end of the pin and causes movement of the pin to a position wherein the other end of the pin causes positioning of the retaining clip in the inoperative position thereof, and a second position wherein the control lever is out of engagement with the pin and thus the pin is free to move axially in response to a force exerted thereon by the clip, so that the retaining clip is thus permitted to move to the operative positive thereof.

Advantageously a stop means is provided for limiting the movement of said control lever. Preferably, the control lever is mounted on the holder body for pivotable movement about an axis intermediate the ends thereof, and the stop means comprises a pair of stops on the holder body which are disposed so as to limit the range of motion of one end of the control lever. The control lever preferably includes a longitudinally outwardly projecting portion of reduced width at that one end which is adapted to move between the pair of stops and which thus determines the range of motion of the control lever.

The retaining clip preferably includes an inwardly projecting portion at the distal other end thereof including a slot therein adapted to engage a groove formed in the shank portion of tool received in the holder body. The retaining clip advantageously comprises an elongate spring member secured at the aforesaid one end thereof to the bottom or other end of the holder body.

The holder body preferably includes a shank portion at the other end thereof adapted to be received in a chuck of a drive unit for the holder device.

In accordance with a further aspect of the invention, a tool assembly is provided which comprises a plurality of tools each having a retaining groove in the shank portion thereof, and a tool holder device as described above.

Other features and advantages of the invention will be set forth in, or apparent from, the detailed description of preferred embodiments of the invention which follows.

DESCRIPTION OF THE PREFERRED EMBODIMENTS

Figure 1:
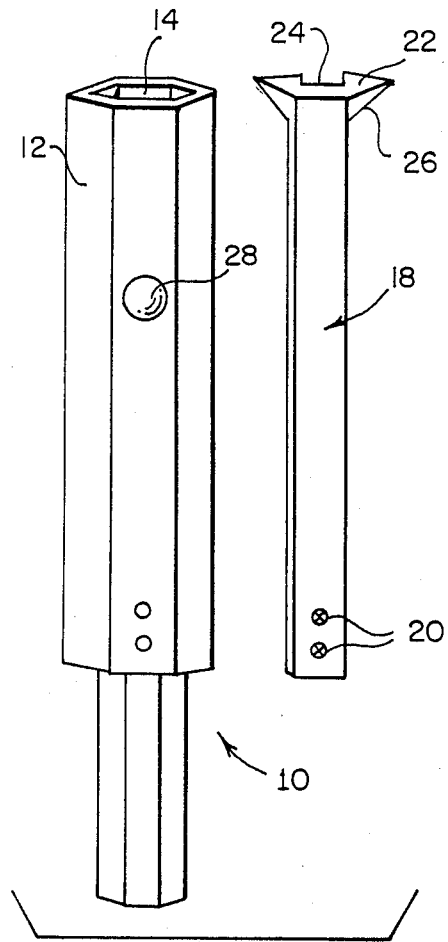
FIG. 1 is an exploded perspective of a preferred embodiment of the tool holder device of the invention.
Figure 2:
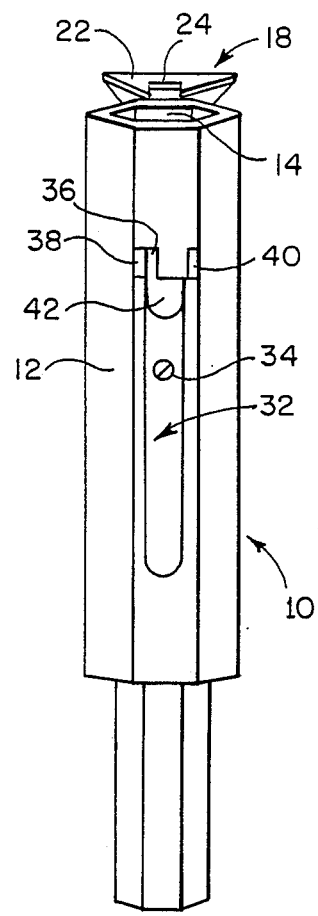
FIG. 2 is a perspective view of the opposite side of the device of FIG. 1.
Figure 3:
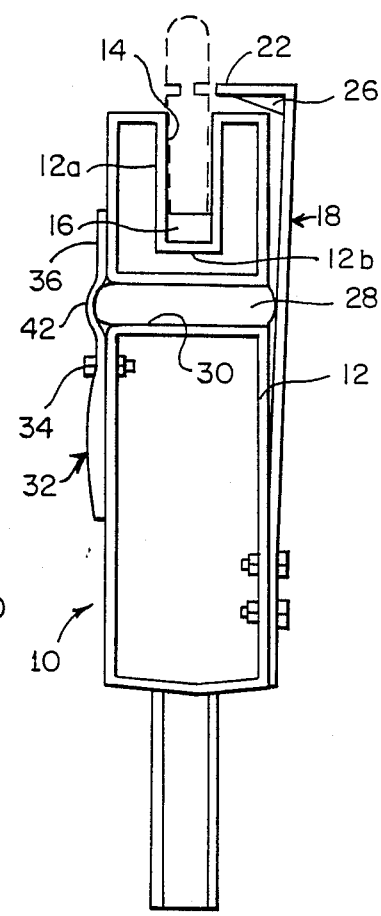
FIG. 3 is a side elevational view, partially in section, of the device of FIG. 1.

Referring to FIGS. 1 to 3, the tool holding device of the invention, which is generally denoted 10, includes a holder body 12 having an hexagonal bore or opening 14 provided therein, at the upper end thereof as indicated in FIG. 3, in which a working tool, e.g., a drill bit, screwdriver bit or like tool, can be received. In the illustrated embodiment, body 12 is of a hollow construction, and opening 14 is defined by inwardly projecting walls 12a of holder body 12 which terminate in a base or bottom wall 12b. As shown in FIG. 3, a magnet 16 is supported at the base of opening 14 which exerts a holding force on a working tool in place in opening 14 and which serves to magnetize the screw tip of a screwdriver type tool. The tool holding device 10 further comprises a shank portion 18 which is adapted to be received in the chuck (not shown) of an electric powered or cordless drill (not shown) or other suitable device for providing rotation of or otherwise manipulating a tool held in opening 14 in tool holder body 12.

A spring retaining clip 18 is secured at the bottom end thereof by screws 20 to the base of body 12. The upper or distal end of clip 18 includes an inwardly projecting portion or flange 22 having a notch or slot 24 therein which is adapted to engage in a corresponding groove in a tool to be retained in body 12, as is discussed in more detail below. Reinforcing gussets 26 are provided on retaining clip 18 at the distal end thereof to afford additional strength in the area of inwardly extending portion 22.

An axially displaceable control pin 28, mounted in a transverse opening 30 (FIG. 3) in the holder body 12, serves to control bending or pivoting movement of retaining clip 18 between a inoperative or withdrawn position, shown in FIG. 3, and a normal operative or active position, inwardly of the withdrawn portion thereof, wherein clip 18 lies flat against body 12 and wherein, in use, notch 24 engages in the corresponding groove of tool held in body 12.

Axial movement of control pin 28 is controlled by a control lever or control member 32 which is mounted on holder body 12 so as to pivot intermediate the ends thereof about an axis defined by a screw 34 secured to body 12. As is perhaps best seen in FIG. 2, the upper or control end of control lever 32 includes a finger 35 which is movable between a pair of stops 38 and 40 (FIG. 2) formed on holder body 12, these stops thus determining the range of motion of the control lever 32. The bottom end of control lever 32 is shaped to form a handle for gripping by a user of the device to effect the limited displacement of the finger 36 between the end positions thereof determined by stops 38 and 40. A rounded indentation or recess 42 (FIGS. 2 and 3) is provided in control lever 32 in which one end of the control pin 28 can be received.

It will be understood that, in operation, displacement of the upper end of control lever 32 to the right as viewed in FIG. 2 causes this end to be moved out of engagement with the adjacent end of control pin 28, so that spring clip 18 is thereby permitted force pin 28 to the left as viewed in FIG. 3, and thus clip 18 assumes its operative or active position wherein slot 24 thereof engages in the corresponding groove of a tool held in opening 14. On the other hand, pivoting movement of the upper end of control lever 12 to left as viewed in FIG. 2, to the position shown in FIG. 2, forces pin 28 to the right as viewed in FIG. 3 to the position shown in FIG. 3, thereby causing pivoting of clip 18 away from holder body 12 and hence producing consequent disengagement of clip 18 from a tool retained in the upper opening 14 of holder body 12. With retainer clip 18 so disengaged a tool held in holder 12 can be simply lifted out of opening 14 against the force exerted by magnet 16.

Figure 4:
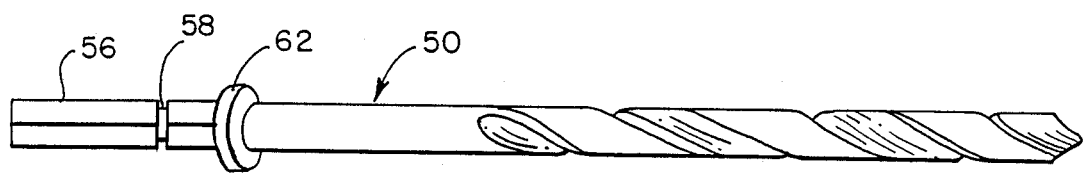
FIG. 4 is a side elevational view of a drill bit adapted for use with the tool holder device of FIG. 1.
Figure 5:
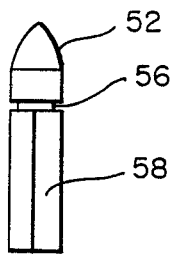
FIGS. 5 and 6 are side elevational views of two different types of screwdriver (screw) bits adapted for use with the device of FIG. 1.
Figure 6:
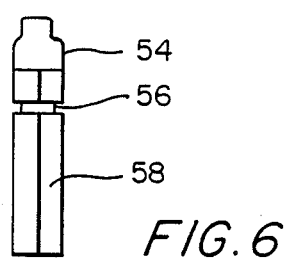

Examplary tools which have been adapted for use with tool holder device 10 are shown in FIGS. 4, 5 and 6. FIG. 4 illustrates a drill bit 50, FIG. 5 a Phillips head screw tip 52, and FIG. 6 a flat bladed screw tip 54. Each of these tools includes, in common with the others, a shank 56 sized or dimensioned to be received in opening 14 in holder body 12 and a shaped groove 58 which is adapted to be engaged by the slot or notch 24 of retaining clip 18 of tool holder device 10. Thus, referring again to FIG. 3 which shows, in a dashed lines, a screw tip 52 corresponding to that of FIG. 3 received in opening 14 in body 12, the length of the shank 56 is such that groove 58 is disposed opposite the inwardly extending portion 22 of clip 18 so that slot 24 therein will engage groove 58 when clip 18 is permitted to move to the operative position thereof.

It is noted that drill bit 50 of FIG. 4 includes a annular boss or shoulder 62 which prevents bit 50 from entering too far into the hole produced thereby, hence preventing the clip 18 from striking the material being drilled and thus being damaged.

It will be appreciated from the foregoing that the tool holder device 10 provides sure, positive retention of a tool held therein through the retaining action of spring clip 18 (as well as magnet 16) but that clip 18 of the holder 10 can be very quickly and readily disengaged by simply turning control lever in a direction wherein control pin 28 is displaced axially towards clip 12 to force clip 18 out of engagement with the tool retained in holder 12.

Although the present invention has been described relative to exemplary embodiments thereof, it will be understood by those skilled in the art that variations and modifications can be effected in these exemplary embodiments without departing from the scope and spirit of the invention.

What is claimed is:

1. A quick disconnect tool holder device for drill bits, screw bits and like tools of the type including a shank, said device comprising:

a holder body defining a tool receiving opening in one end thereof for receiving the shank of a tool therein;

a retaining clip means secured at one end thereof to said holder body and movable between a operative position wherein the other end of said clip means engages a tool received in the opening in said holder body and an inoperative position wherein the clip means is out of engagement with such a tool;

an axially movable control pin received in a transerse bore through said holder body and of a length longer than said bore; and a control lever means mounted on said holder body for movement between a first position wherein said lever means engages one end of said pin and causes movement of said pin to a position wherein the other end of said pin engages said retaining clip means to cause movement thereof into in the inoperative position thereof, and a second position wherein said control lever means is out of engagement with said pin and thereby permits movement of said retaining clip means to the operative positive thereof.

2. A device as claimed in claim 1 further comprising stop means for limiting the movement of said control lever means.

3. A device as claimed in claim 1 wherein said control lever means is mounted on said holder body for pivotable movement about an axis intermediate the ends thereof, and said stop means comprises a pair of stops on said holder body which limit the range of motion of one end of said control lever means.

4. A device as claimed in claim 3 wherein said control lever means includes a longitudinally outwardly projecting portion of reduced width at said one end which is adapted to move between said stops.

5. A device as claimed in claim 1 wherein said retaining clip means includes an inwardly projecting portion at said other end thereof including a slot therein adapted to engage a groove formed in a shank portion of a tool received in said holder body.

6. A device as claimed in claim 1 wherein said retaining clip means is an elongate spring member secured at said one end thereof to said other end of said holder body.

7. A device as claimed in claim 1 wherein said holder body includes a shank portion at the other end thereof adapted to be received in a chuck of a drive unit for the holder device.

8. A tool assembly comprising a tool holder device and a plurality of tools adapted to be received in and held by said tool holder, said tools each comprising a shank portion including a retaining groove therein and said tool holder device comprises:
- a holder body defining a tool receiving opening in one end thereof for receiving the shank of a said tool therein;
- a retaining clip means secured at one end thereof to said holder body and movable between a operative position wherein the other end of said clip means engages a said tool received in the opening in said holder body and an inoperative position wherein the clip means is out of engagement with that tool;
- an axially movable control pin received in a transverse bore through said holder body and of a length longer than said bore; and
- a control lever means mounted on said holder body for movement between a first position wherein said lever means engages one end of said pin and causes movement of said pin to a position wherein the other end of said pin engages said retaining clip means to cause movement thereof into in the inoperative position thereof, and a second position wherein said control lever means is out of engagement with said pin and thereby permits movement of said retaining clip means to the operative positive thereof.

9. A device as claimed in claim 8 further comprising stop means for limiting the movement of said control lever means.

10. A device as claimed in claim 8 wherein said control lever means is mounted on said holder body for pivotable movement about an axis intermediate the ends thereof, and said stop means comprises a pair of stops on said holder body which limit the range of motion of one end of said control lever means.

11. A device as claimed in claim 10 wherein said control lever means includes a longitudinally outwardly projecting portion of reduced width at said one end which is adapted to move between said stops.

12. A device as claimed in claim 8 wherein said retaining clip means includes an inwardly projecting portion at said other end thereof including a slot therein adapted to engage the groove in the shank portion of a tool received in said holder body.

13. A device as claimed in claim 8 wherein said retaining clip means an elongate spring member secured at said one end thereof to said other end of said holder body.

14. A device as claimed in claim 8 wherein said holder body includes a shank portion at the other end thereof adapted to be received in a chuck of a drive unit for the holder device.

* * * * *